United States Patent [19]
Earl

[11] Patent Number: 5,674,593
[45] Date of Patent: Oct. 7, 1997

[54] STRUCTURAL LAMINATE WITH CORRUGATED CORE AND RELATED METHOD

[75] Inventor: Gary L. Earl, Hoquiam, Wash.

[73] Assignee: Anderson & Middleton Company, Hoquiam, Wash.

[21] Appl. No.: 421,328

[22] Filed: Apr. 13, 1995

[51] Int. Cl.$^6$ .............................. B32B 3/28; B32B 31/00
[52] U.S. Cl. .......................... 428/182; 428/120; 428/186; 156/213; 156/250; 156/264; 156/292
[58] Field of Search .................................. 428/182, 184, 428/178, 120, 213, 186, 534; 156/60, 152, 213, 250, 264, 292

[56] References Cited

U.S. PATENT DOCUMENTS

| | | | |
|---|---|---|---|
| 3,661,099 | 5/1972 | Shelor | 108/51 |
| 4,424,753 | 1/1984 | Eatherton | 108/51.1 |
| 5,008,359 | 4/1991 | Hunter | 527/103 |
| 5,140,086 | 8/1992 | Hunter et al. | 527/103 |
| 5,433,156 | 7/1995 | Hutchison | 108/51.1 |

*Primary Examiner*—Donald Loney
*Attorney, Agent, or Firm*—Nixon & Vanderhye P.C.

[57] ABSTRACT

This invention provides a structural laminate which includes thin outer layers of cellulose polymer material sandwiched about a corrugated cardboard core, where flutes of the corrugated extend perpendicularly between the outer layers of cellulose polymer material. More specifically, the outer layers of the composite are relatively thin sheets of a delignified cellulose polymer material, and the core comprises conventional corrugated cardboard with at least some, and preferably all of the flutes oriented on edge, i.e., extending perpendicularly between the outer layers. A related method comprises the steps of:

a) forming a stack of corrugated cardboard sheets to a predetermined height, the sheets adhesively secured, one to the other;

b) cutting a plurality of strips of predetermined width from the stack;

c) turning one or more of the strips 90° and adhesively securing the one or more strips to an inside surface of a first outer sheet, thereby forming the inner core; and d) adhesively securing a second outer sheet over the inner core.

18 Claims, 3 Drawing Sheets

FIG. 4
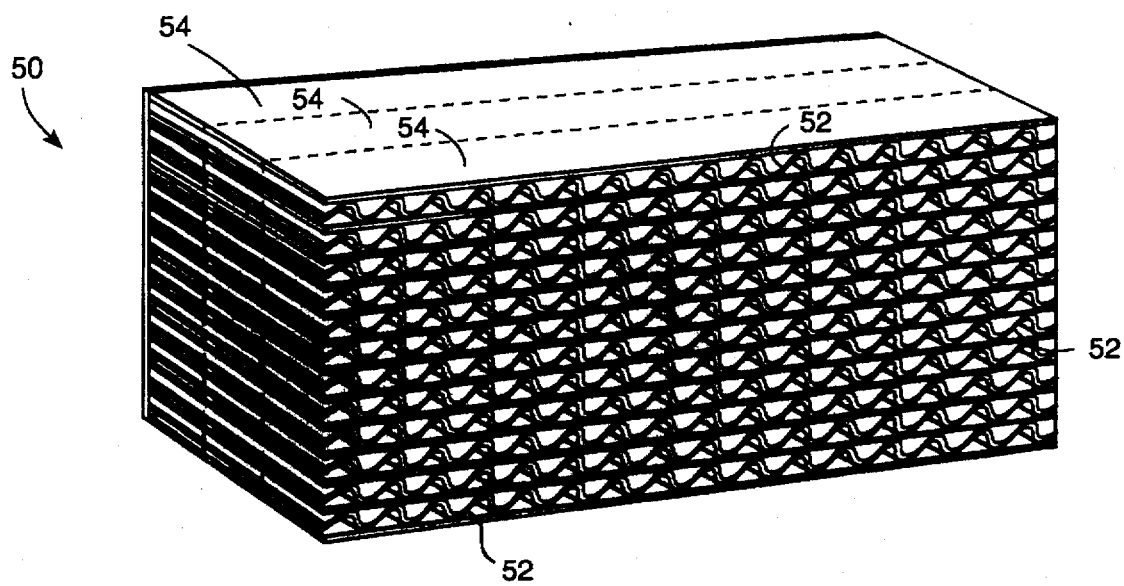
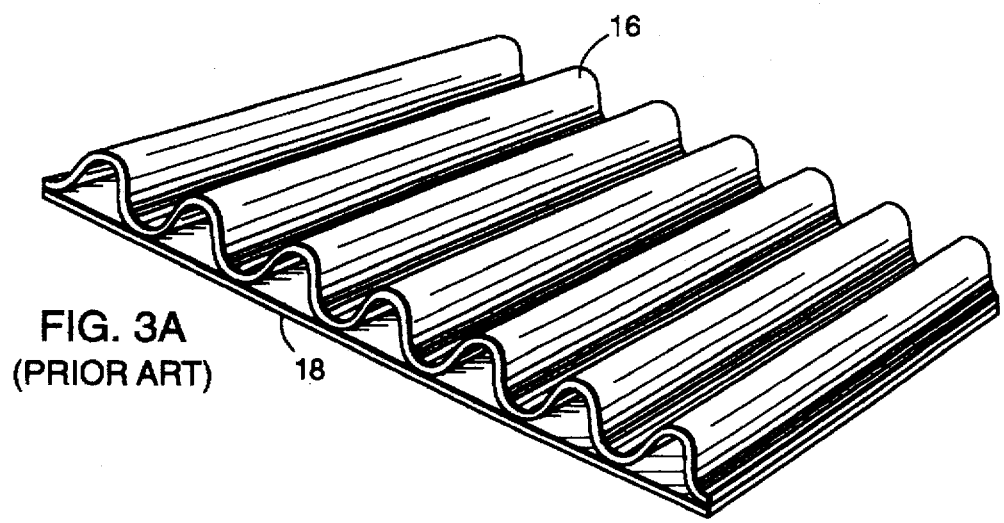
FIG. 3A
(PRIOR ART)

STRUCTURAL LAMINATE WITH CORRUGATED CORE AND RELATED METHOD

This invention relates to a structural composite incorporating two layers of a cellulose polymer material about a corrugated core, and a method for making the same. The composite has application in shelving, cabinet construction, and in virtually any field where particleboard is presently employed.

BACKGROUND

Current structural composites utilized as substitutes for solid wood include particleboard covered with vinyl, melamine or other decorative material. A significant disadvantage of particleboard, however, is its weight and relatively high manufacturing costs. Thus, there is a need for a lightweight but strong wood substitute which is less costly to manufacture.

DISCLOSURE OF THE INVENTION

This invention provides a structural laminate which includes thin outer sheets or layers sandwiched about a corrugated cardboard core.

More specifically, the outer layers of the composite are relatively thin sheets of a delignified cellulose polymer material, and the core comprises conventional corrugated cardboard with at least some, and preferably all of the flutes oriented on edge, i.e., extending lengthwise perpendicularly between the outer layers.

The material comprising the outer layers is preferably a composite of delignified cellulosic material and an isocyanate resin. In the preferred composition, the cellulosic material is "kraft linerboard" commonly used to the outer layers of corrugated board typically used in the construction of shipping cartons. The preferred resin is a polyisocyanate compound, poly (diphenylmethane), in combination with an organic solvent such as propylene carbonate. In the preferred arrangement, the kraft linerboard is impregnated with the polyisocyanate resin and then cured by simultaneous application of heat and pressure.

The core material utilizes standard corrugated cardboard, having selected flute specifications, depending on core density requirements. Sheets of corrugated cardboard are glued together, one on top of the other, to form a stack of desired height. Within the stack, the flutes of the corrugated sheets run horizontally along the length (or width) of the sheets. This composite stack is then sliced vertically along the length of the stack to provide strips of corrugated of predetermined width. The strips are then turned 90° and glued to the inside surface of one of the outer layers, such that the flutes are oriented "on edge", i.e., running vertically (or perpendicularly) relative to the outer layers. It will be appreciated that the width of the strips cut from the stack determine the thickness of the structural laminate and that the height of the stack determines the width (or multiples or fractions of the width) of the laminate, as explained in greater detail herein.

After the other of the outer layers is glued to the corrugated core, and the member further cut to size if necessary, the edges of the laminate may be covered with a wood veneer or other suitable material. The entire member can then be covered with melamine or vinyl or other suitably attractive material, depending on the specific application for the laminate.

In its broader aspects, therefore, the present invention relates to a composite laminate member comprising outer layers of a polymer cellulose material sandwiched about a core of corrugated cardboard including a plurality of layers of substantially parallel flutes, and wherein at least some of the flutes extend perpendicularly between the outer layers.

In another aspect, the invention relates to a method of forming a composite laminate member including a pair of outer sheets sandwiched about an inner core comprising the steps of:

a) forming a stack of corrugated cardboard sheets to a predetermined height, the sheets adhesively secured, one to the other;

b) cutting a plurality of strips of predetermined width from the stack;

c) turning one or more of the strips 90° and adhesively securing the one or more strips to an inside surface of a first outer sheet, thereby forming the inner core; and d) adhesively securing a second outer sheet over the inner core.

BRIEF DESCRIPTION OF THE DRAWINGS

FIGS. 3A through 3D are perspective views of known corrugated constructions useful in the manufacture of the invention;

FIG. 4 is a perspective, partially cut away, showing a stack of corrugated cardboard in an intermediate stage of the manufacture of the composite laminate of this invention.

DETAILED DESCRIPTION OF THE DRAWINGS

Figure 1:
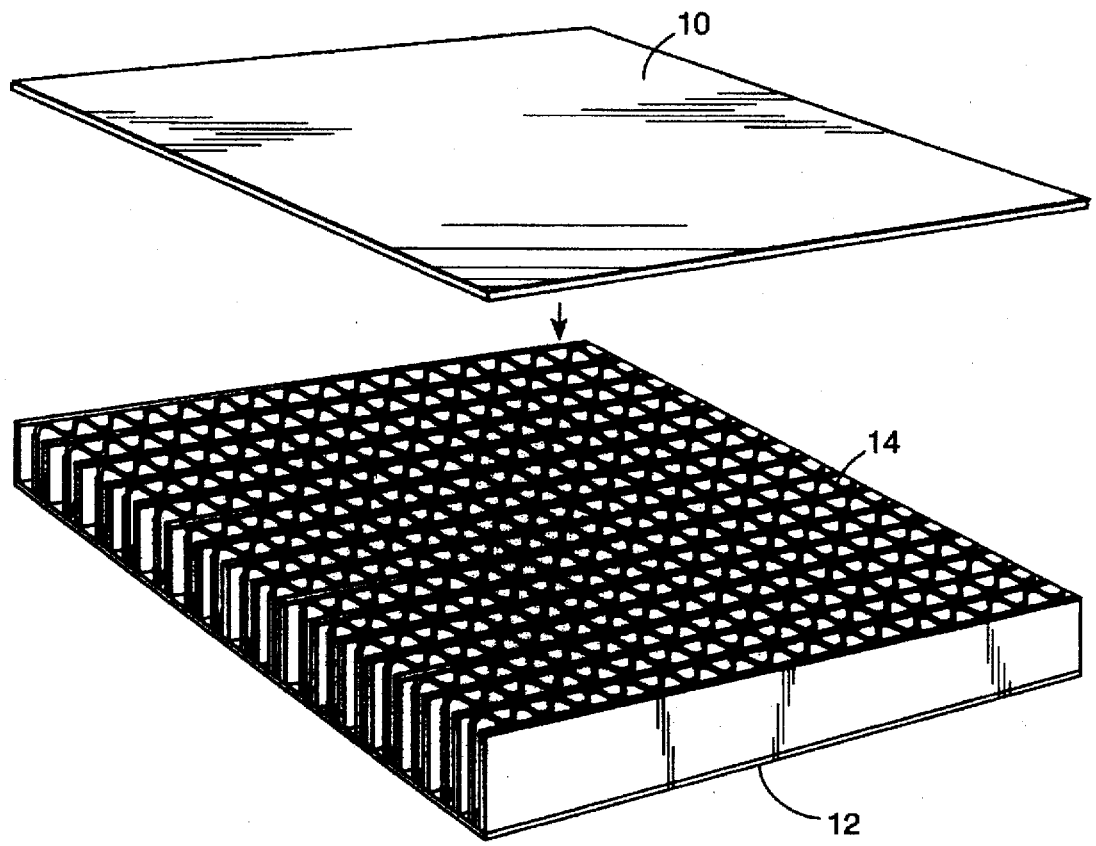
FIG. 1 is a partially exploded view of a composite laminate in accordance with the invention.
Figure 2:
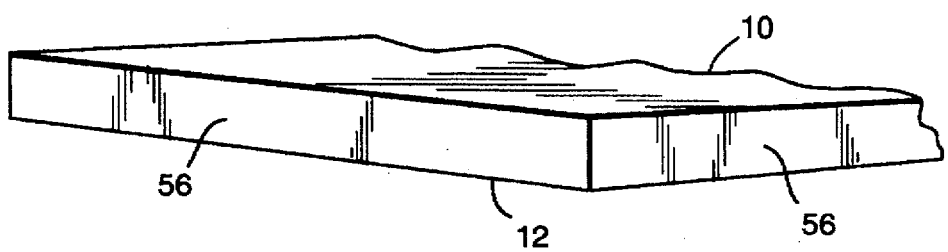
FIG. 2 is a partial perspective of a finished product in accordance with the invention.

With reference initially to FIGS. 1 and 2, the structural laminate of this invention comprises two outer layers of polymer cellulose material 10 and 12 sandwiched about an inner core 12 of corrugated cardboard.

The specific polymer cellulose material employed in making the outer layers 10 and 12 is commercially available from Weyerhauser Company and is sold under the trade name P-Cel™. The material is made in the manner disclosed in U.S. Pat. Nos. 5,140,086 and 5,008,356. This is a composite material of 80–90% delignified cellulose and 10–20% thermoset polymers, and is available in thicknesses between 0.004" and 1.00". For purposes of this invention, layers 10 and 12 may be about 0.033" thick. As disclosed in the '086 patent, the cellulosic material is selected from the group consisting of pulped cellulose fibers, chemical pulps, thermomechanical pulps, bleached and unbleached paper and paper-like materials, non-woven mats, sheets and felts. The preferred cellulosic material component of the composite is kraft linerboard, a paper-like board made according to the kraft (sodium sulfate) method of papermaking. The preferred polymer is a polyisocyanate compound, poly (dephenylmethane diisocyanate) also known as PMDI (available from Dow Chemical Corporation of Midland, Mich. under the name PAPI-2027). An organic solvent is used as a diluent for the PMDI, and the preferred solvent is propylene carbonate. The mixture of the PMDI and solvent is referred to simply as an isocyanate resin. Reference is made to the '359 and '086 patents for a detailed discussion of the manufacturing process which produces the polymer cellulose material which is particularly suitable for use with this invention.

The inner core 12 is conventional corrugated cardboard. The density of the core can be varied to suit requirements, by varying the flute selection. Standard flute designations are differentiated by a specific number of flutes per unit length and specific chordal heights. It will be appreciated that core strength increases with flute density. Standard flute specifications are provided below in Table I.

TABLE 1

Standard Flute Specification

| Standard Contour | Flutes Per Horizontal Foot | Chordal Height - In. |
|---|---|---|
| A-flute | 33 | 0.185 |
| B-flute | 47 | 0.093 |
| C-flute | 39 | 0.135 |
| E-flute | 90 | 0.045 |
| F-flute | 128.0 | 0.028 |
| L-flute | 24.7 | 0.271 |

The choice of flute for the corrugated core 12 will depend on specific design requirements. Generally, B, C, E or L flutes are preferred for this invention. In addition to flute selection, it will be understood that various standard corrugated constructions may be used in the invention, including single face, single wall, double wall and triple wall. Of the above, triple wall provides the greatest strength. Thus, triple wall construction combined with the density of B-flute, provides a core of exceptional strength.

FIG. 3A illustrates conventional single face corrugated, which includes one layer 16 of corrugated medium and a single layer 18 of linerboard.

Figure 3B:
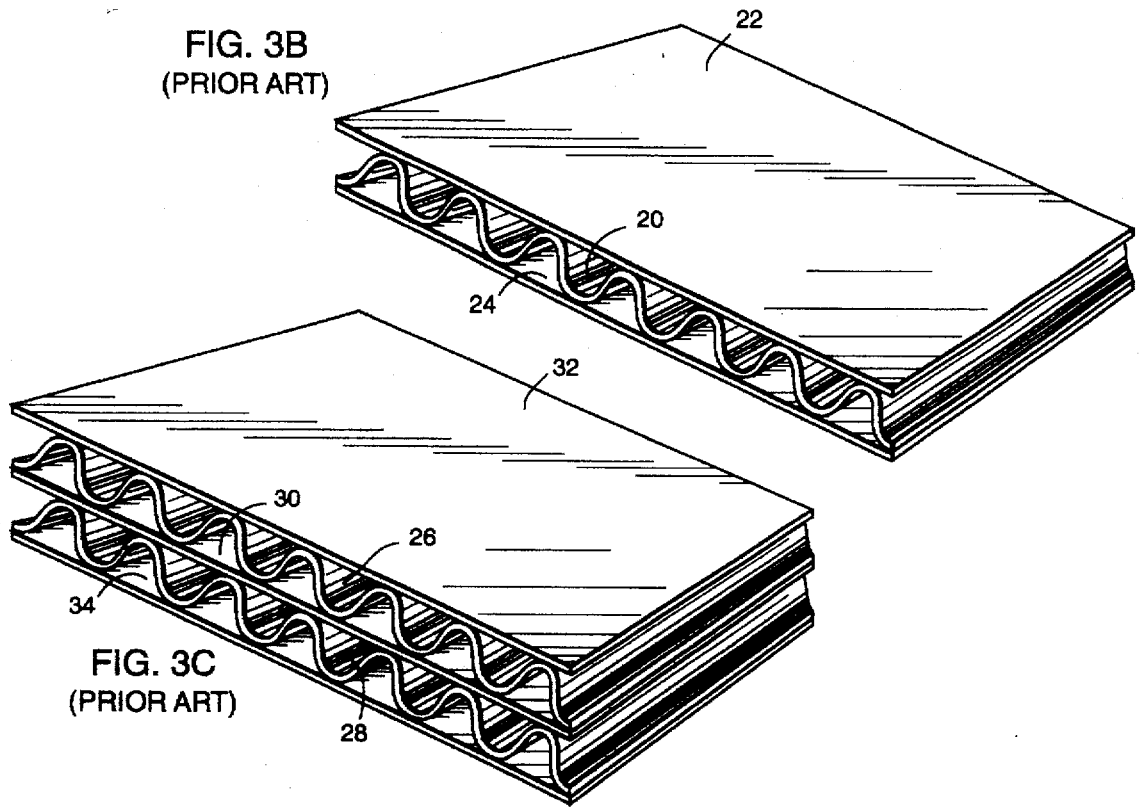

FIG. 3B illustrates conventional single wall corrugated, including one layer 20 of corrugated medium sandwiched between a pair of layers 22, 24 of linerboard.

Figure 3C:
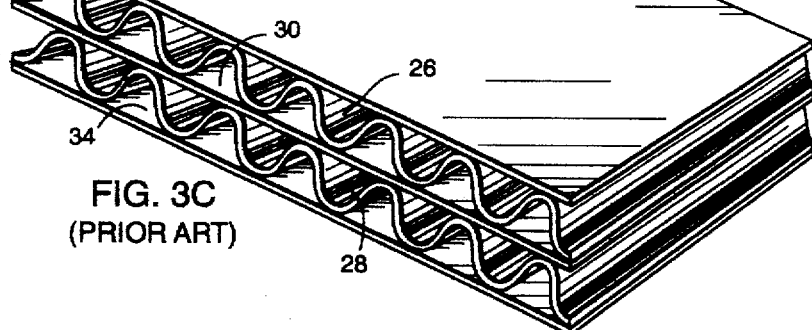

FIG. 3C illustrates conventional double wall corrugated, including two layers 26, 28 of corrugated medium (in this case, with an A-B flute construction), separated by an intermediate layer 30 of linerboard, and sandwiched between outer layers 32, 34 of linerboard.

Figure 3D:
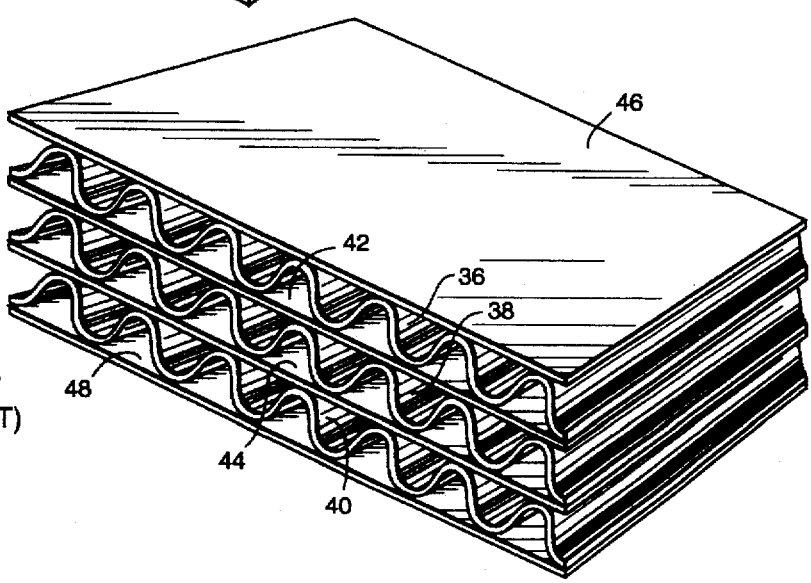

FIG. 3D illustrates conventional triple wall corrugated, including three layers 36, 38 and 40 of corrugated medium (in this case, with B-A-C flute construction), where the corrugated layers are separated by intermediate layers 42 and 44 of linerboard, and wherein outer layers 46 and 48 are also constructed of linerboard.

With reference now to FIG. 4, the initial steps required to form the core 12 include gluing together a stack 50 of conventional corrugated sheets (incorporating any of the above described corrugated constructions but also including other combinations not specifically discussed), with flutes extending horizontally, to a predetermined height, e.g., 4 to 8 inches. In a preferred arrangement, all of the sheets are similarly oriented, with all flutes 52 running lengthwise in the same horizontal direction. Some applications, however, may call for the sheets to alternate direction, with the flutes of one sheet running horizontally in one direction and the flutes of an adjacent sheet running horizontally in a perpendicular direction.

This stack 50 of corrugated sheets is then sliced vertically and longitudinally in strips 54 of predetermined width, e.g., from about ⅜ to about 1" or more along the dotted lines shown in FIG. 1.

The strips 54 cut from the stack 50 are then turned 90° and glued to the underlying layer 12 of polymer cellulose material, such that the flutes 52 run vertically (i.e., extend perpendicularly) relative to the horizontal underlying layer 12. If the stack 50 contains alternate sheets with flutes running in perpendicular horizontal directions, then when the strips 54 are rotated 90° for gluing to the lower sheet 12, the corrugations or flutes 52 in alternate sheets in the finished product will run perpendicular and parallel, respectively, to the outer layers 10 and 12. The upper layer 10 of polymer cellulose material is then glued to the core 14 as illustrated in FIG. 1, to complete the laminate construction. It is preferred, however, that all flutes extend perpendicularly between the outer layers 10, 12.

It will be appreciated that the height of the stack 50 and the width of the strips 54 cut from the stack may be chosen in accordance with specific requirements. Generally, the width of the strips 54 determine the approximate thickness of the laminate, and the height of the stack 50 determines the width of the laminate, or a multiple or fraction thereof. For example, if the stack 50 has a height of four inches, the width of the laminate may be four inches as well. Alternatively, a pair of strips 54 turned on edge, may be laid in side-by-side relation to form a member with a width of eight inches. Three such strips will result in a laminate twelve inches wide. At the same time, if for example, the stack 50 is eight inches high, the strip or strips 54, after being glued in place between outer layers having a width of eight inches, may be cut to provide two laminates, each four inches wide. It will be appreciated, however, that the height of the stack 50 is not critical and may in fact be dependent on the type of cutter used in the cutting step. In a preferred process of manufacture, a sufficient number of strips 16 of selected widths will be employed to permit making a 4×8 structural laminate sheet which can be used as is, or subsequently cut to any desired length or width. Core thickness can be altered simply by changing the width of strips 54.

For most applications, and particularly for shelving or related applications where appearance is important, the edges of the structure (after final sizing), will be covered by ⁵⁄₁₆ or ¼ inch wood strips 56, glued in place. Alternatively, the edging may be of the same polymer cellulose or other veneer material glued in place after the corrugated edges have been filled with putty or other suitable material.

The entire construction may thereafter be covered with wood grain vinyl, melamine or other suitably attractive surface finishes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A composite laminate member comprising thin, flat outer layers of a polymer cellulose material sandwiched about a core of corrugated cardboard including a plurality of layers of substantially parallel flutes, and wherein at least some of said flutes extend perpendicularly between said core and said outer layers, wherein the polymer cellulose material comprises delignified cellulose material impregnated with a polyisocyanate compound.

2. The composite laminate of claim 1 wherein said core comprises a plurality of substantially identical sheets of corrugated cardboard adhesively secured together, and wherein said outer layers of polymer cellulose material are adhesively secured to said core.

3. The composite laminate of claim 2 wherein said plurality of substantially identical sheets of corrugated cardboard are oriented such that all flutes extend perpendicularly between said outer layers.

4. The composite laminate of claim 2 wherein said plurality of substantially identical sheets of corrugated cardboard are arranged such that for alternate sheets, the flutes run in perpendicular directions.

5. The composite laminate of claim 1 wherein said outer layers each have a thickness of at least about 0.004".

6. The composite laminate of claim 1 wherein said core has a thickness of at least about ⅜".

7. The composite laminate of claim 1 wherein the polymer cellulose material comprises kraft linerboard and wherein the polyisocyanate compound is diluted with a solvent.

8. The composite laminate of claim 7 wherein the solvent is propylene carbonate.

9. The composite laminate of claim 1 wherein the corrugated cardboard incorporates a flute configuration selected from the group consisting essentially of B, C, E and L flute corrugated.

10. The composite laminate of claim 9 wherein the corrugated cardboard comprises single wall corrugated.

11. The composite laminate of claim 9 wherein the corrugated cardboard comprises single face corrugated.

12. The composite laminate of claim 9 wherein the corrugated cardboard comprises double wall corrugated.

13. The composite laminate of claim 7 wherein the corrugated cardboard comprises triple wall corrugated.

14. A method of forming a composite laminate member including a pair of thin, flat outer sheets sandwiched about an inner core comprising the steps of:

a) forming a stack of corrugated cardboard sheets to a predetermined height, the sheets adhesively secured, one to the other;

b) cutting a plurality of strips of predetermined width from said stack;

c) turning one or more of the strips 90° and adhesively securing the one or more strips to an inside surface of a first outer sheet, thereby forming the inner core; and d) adhesively securing a second outer sheet on an opposite side of the inner core, wherein said pair of outer sheets comprise polymer cellulose material impregnated with a polyisocyanate compound.

15. The method of claim 14 wherein all flutes in the core extend perpendicularly between the outer sheets.

16. The method of claim 14 wherein the flutes are selected from the group consisting essentially of B, C, E and L flute corrugated.

17. The method of claim 14 wherein the corrugated cardboard is selected from the group consisting of single wall, single face, double wall and triple wall corrugated.

18. The method of claim 14 wherein the polymer cellulose material comprises kraft linerboard and wherein the polyisocyanate compound is diluted with a solvent.

* * * * *